United States Patent

[11] 3,578,265

| [72] | Inventors | John W. Patierno<br>Huntington Beach;<br>Vernon L. White, Los Angeles; Haig<br>Asdurian; Hans W. Grellmann, Torrance,<br>Calif. |
|------|-----------|---|
| [21] | Appl. No. | 864,034 |
| [22] | Filed | Oct. 6, 1969 |
| [45] | Patented | May 11, 1971 |
| [73] | Assignee | Northrop Corporation<br>Beverly Hills, Calif. |

[54] AERODYNAMIC STRUCTURES
3 Claims, 3 Drawing Figs.

[52] U.S. Cl. .................................................. 244/42
[51] Int. Cl. .................................................. B64c 3/00
[50] Field of Search ........................................ 244/42,
42.4, 42.43, 42.46, 42.47, 42.48, 42.50, 40, 41, 1, 4

[56] References Cited
UNITED STATES PATENTS
2,510,959  6/1950  Custer ........................... 244/42(X)

Primary Examiner—Milton Buchler
Assistant Examiner—Carl A. Rutledge
Attorneys—Harold L. Fox and Willard M. Graham ABSTRACT: A jet-type aircraft the wings of which define slots or passageways passing through root portions of the wings and opening on the upper and lower surfaces thereof functioning (1) to divert fuselage boundary layer air from side mounted inlets located below the wings and (2) to reduce adverse fuselage boundary layer pressure gradients and prevent boundary layer thickening ahead of the engine inlets at high angles of attack or sideslip.

Patented May 11, 1971 3,578,265
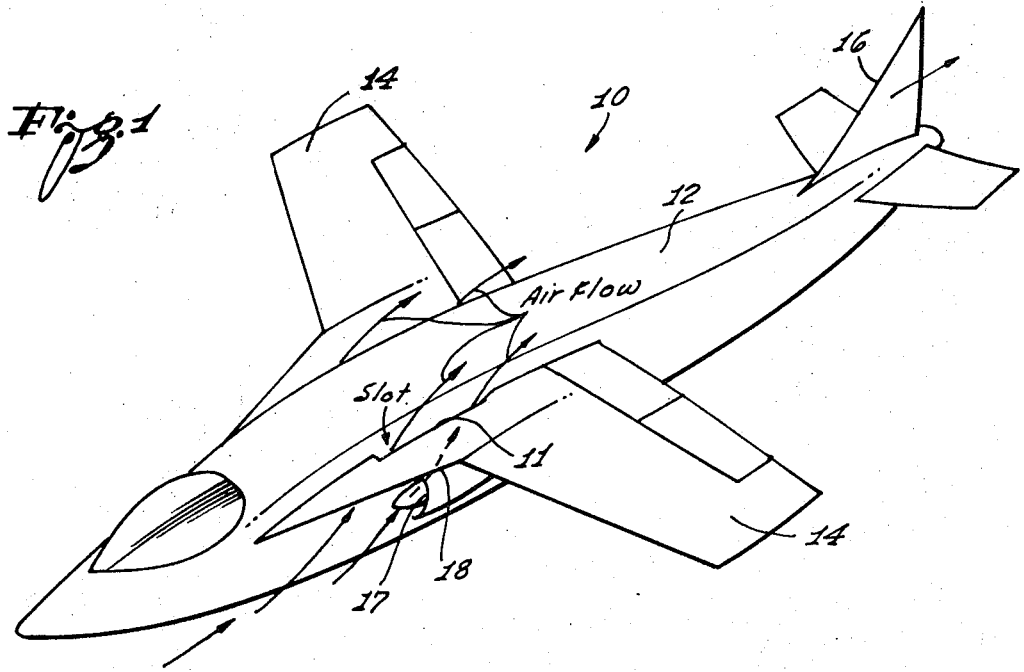
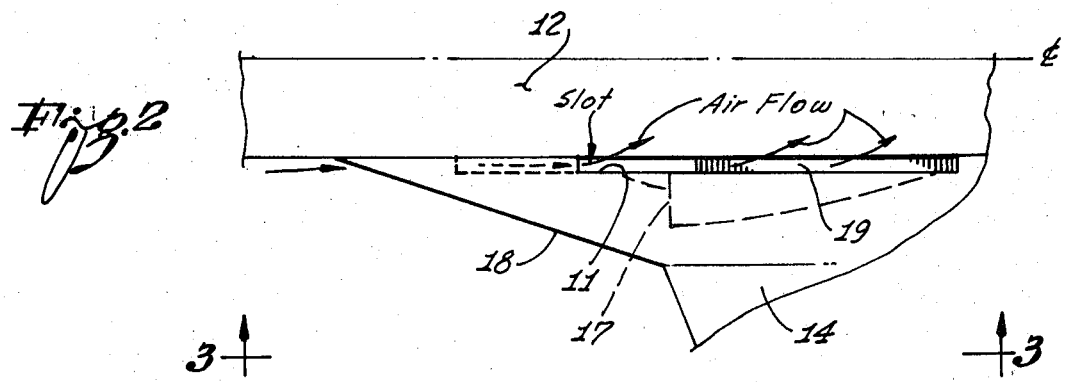
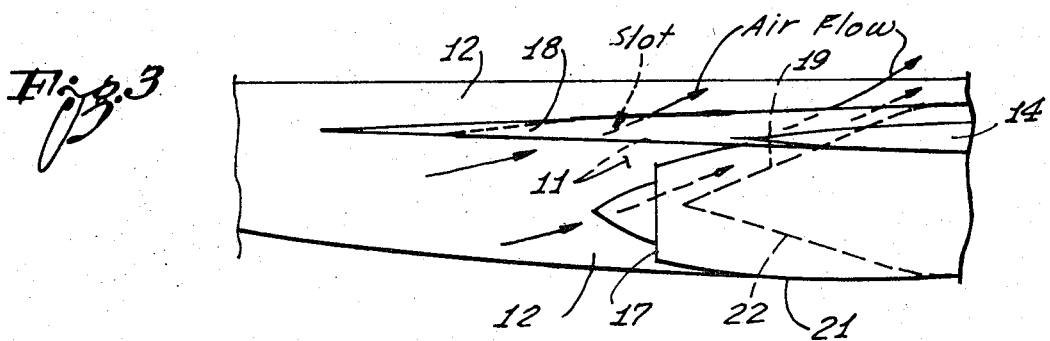
INVENTORS:
John W. Patierno
Vernon Lee White
Haig Asdurian
Hans Werner Grellmann
By Harold L. Fox
Agent

AERODYNAMIC STRUCTURES

The present invention relates generally to removal of boundary layer air from aircraft and more particularly to an airplane in which the root portions of the wings define slots or passageways functioning to remove boundary layer air from the airplane's fuselage, especially from the areas immediately ahead of and adjacent to air inlets or scoops of turbine-type engines.

In the design of airplanes and like vehicles numerous conditions under which the vehicle is to operate must be given special consideration if the vehicle is to perform and operate satisfactorily and/or at optimum efficiency. Thickening of boundary layer air proves to be quite troublesome especially in the area of air inlets or scoops in connection with vehicles powered by turbine engines.

Briefly in the embodiment shown and described herein, a jet-type airplane is shown having air intakes or scoops mounted adjacent to the side of the fuselage and under a portion of the wings extending forward of the air intakes or scoops. Root portions of the wings define respective slots or passageways originating on the lower surface and terminating on the upper surface of the wings of the airplane. The slots or passageways functioning to bleed boundary layer air from the fuselage and especially the areas immediately ahead of and adjacent to the air intakes. The aforementioned boundary layer air is ported to air flowing over the upper surface of the wings, accordingly low energy boundary layer air is not received and ingested by the engines of the airplane.

An object of the present invention is to disclose an aircraft wing the root portion of which defines a chordwise slot extending between the upper and lower surfaces thereof functioning to divert fuselage boundary layer air from the region ahead of side mounted air inlets located below the wings of the aircraft.

Another object is to disclose an aircraft wing the root portion of which defines a slot extending between the upper and lower surfaces thereof functioning to reduce adverse fuselage boundary layer pressure gradients and prevent boundary layer thickening ahead of the inlets at high angles of attack or sideslip.

Although the characteristic features of the present invention are particularly pointed out in the appended claims, the invention itself, also the manner in which it may be carried out, will be better understood by referring to the following description taken in connection with the accompanying drawings forming a part of this application and in which:

FIG. 1 is a perspective view of a jet-type airplane incorporating slots or passageways for removing boundary layer air as disclosed herein.

FIG. 2 is a fragmentary plan view of the airplane of FIG. 1 showing details and location of one of the slots or passageways for the removal of boundary layer air.

FIG. 3 is a side elevational view of FIG. 2.

Referring to the drawing, a jet-type airplane 10 provided with slots or passageways 11 as disclosed herein is shown in FIG. 1. The airplane 10 includes a fuselage, wings, tail assembly and engine inlets or scoops 12, 14, 16 and 17, respectively. By referring further to FIG. 1 it will be seen that the inlets or scoops 17 are located adjacent the sides of the fuselage 12 in a manner presently explained.

In the present embodiment the leading inboard ends of the wings 14 include portions 18 which extend forward of the wings proper, specifically the portions 18 extend forward of the engine inlets or scoops 17.

The slots or passageways 11 extend completely through the root portions of the wings 14 and the forward portions 18 thereof, as best seen in FIG. 3, from positions forward of the inlets 17 and terminate aft of the inlets, accordingly the longitudinal (chordwise) extent of the slots is fairly great. They (slots 11) are generally rectangular in cross section, the surfaces thereof being perfectly smooth, streamlined and free of obstructions which would impede the flow of fluid therethrough. The upper surface of the passageways 11 are defined by internal surfaces of the portions 18 of the wings while the lower portions thereof are defined by a dividing wall 19 constituting structure of the nacelle 21 and an internal surface of the wings 14. In this respect the forward end of the nacelle 21 is positioned from the side of the fuselage 12 a distance equal to the width of the passageway 11. Thus, it will be seen that the passageways 11 provide smooth passages for the flow of fluid from the lower surface of the wings 14, and forward portions 18, to the upper surface of the wings.

Under normal conditions, during forward movement of the airplane 10, low energy boundary layer air inherently forms around the fuselage 12, this low energy air is not suitable for engine combustion for reasons known to those skilled in the art. Instead it (low energy air) flows through the passageways 18 and is ported to a low-pressure area on the top side of the wings 14, thus the low energy boundary layer air is not ingested by the airplane engines.

The thickening of fuselage boundary layer air increases at high angles of attack of the airplane. These pressure gradients, occurring at high angles of attack, have adverse effects on the inlet system operation and performance of an airplane. The passageways 11 function to reduce the adverse fuselage boundary layer pressure gradients as a great majority of boundary layer air flows through the passageways 11. Low energy air flowing through the passageway 11 results in thinner boundary layer air in the inlet area at high angles of attack.

Thus, it will be seen that an economical and highly efficient means for removing fuselage boundary layer air is provided.

Although only one embodiment of the disclosure has been described and illustrated, it will be apparent that various changes in construction and arrangement of the various parts may be made without departing from the scope or concept of the invention defined by the claims.

We claim:

1. In a jet propelled airplane, the intakes for supplying air to the propulsion unit of the airplane being spaced from the fuselage of the airplane by structure functioning to divide low energy fuselage boundary layer air above and below the intakes and being positioned below and aft of the leading edge of the airplane's wings, the combination comprising:
   a. structure defining air inlets for the propulsion unit of an airplane which are located adjacent to the fuselage of the airplane and aft of the leading edges of the wings thereof;
   b. root portions of the wings defining major portions of passageways extending completely through the airplane's wings;
   c. structure associated with said air inlets defining upper and lower surfaces functioning to divide low energy fuselage air above and below said air inlets;
   d. and said passageways being of rectangular configuration the upper portion thereof being defined by internal surfaces of the wings of the airplane and the lower portion thereof defined by internal surfaces of the wings of the airplane and said upper surfaces.

2. In an airplane the combination as set forth in claim 1:
   a. in which said upper surfaces and the internal surfaces of the wings of the airplane cooperate to define the lower portion of said passageways and are respectively aligned providing smooth and continuous passageways for the flow of fluid therethrough.

3. In a jet propelled airplane the air intakes for which are positioned adjacent the fuselage of the airplane at a location aft of and below the leading edge of the airplane's wings, the combination comprising:
   a. root portions of the airplane's wings defining passageways extending in a chordwise direction and passing completely through the airplane's wings having their ingress openings on the lower surface and their egress openings on the upper surface thereof to provide an unobstructed flow path for lowering fuselage boundary layer air.